(12) United States Patent
Yang et al.

(10) Patent No.: US 11,540,339 B2
(45) Date of Patent: Dec. 27, 2022

(54) SX PROTOCOL EXTENSION TO SUPPORT NODE PDR

(71) Applicant: Telefonaktiebolaget LM Ericsson (publ), Stockholm (SE)

(72) Inventors: Jiehong Yang, Mölndal (SE); Carlos Jimenez Cordon, Madrid (ES); Miguel Angel Muñoz De La Torre Alonso, Madrid (ES); Miguel Angel Puente Pestaña, Madrid (ES); Yumei Song, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 56 days.

(21) Appl. No.: 16/466,435

(22) PCT Filed: Feb. 15, 2019

(86) PCT No.: PCT/CN2019/075136
§ 371 (c)(1),
(2) Date: Jun. 4, 2019

(87) PCT Pub. No.: WO2019/158116
PCT Pub. Date: Aug. 22, 2019

(65) Prior Publication Data
US 2020/0396779 A1  Dec. 17, 2020

(30) Foreign Application Priority Data
Feb. 15, 2018 (WO) ................ PCT/CN2018/076914

(51) Int. Cl.
H04W 76/12  (2018.01)
H04W 76/11  (2018.01)
H04W 88/16  (2009.01)

(52) U.S. Cl.
CPC ............ H04W 76/12 (2018.02); H04W 76/11 (2018.02); H04W 88/16 (2013.01)

(58) Field of Classification Search
CPC ............................... H04L 12/14; H04M 15/41
(Continued)

(56) References Cited

U.S. PATENT DOCUMENTS

2009/0323520 A1* 12/2009 Kapoor ............... H04L 41/0681
370/464
2011/0080890 A1* 4/2011 Cai ................... H04W 36/0033
455/436
(Continued)

FOREIGN PATENT DOCUMENTS

EP  3487120 A1  5/2019

OTHER PUBLICATIONS

International Search Report and the Written Opinion of the International Searching Authority, issued in corresponding International Application No. PCT/CN2019/075136, dated May 15, 2019, 9 pages.
(Continued)

Primary Examiner — Fabricio R Murillo Garcia
(74) Attorney, Agent, or Firm — Rothwell, Figg, Ernst & Manbeck, P.C.

(57) ABSTRACT

The embodiments herein relate to Sx protocol extension to support node PDR. In one embodiment, there proposes a method (500) in a first network node (301) configured as control plane function (CPF). The first network node (301) is coupled to a second network node (302) configured as user plane function (UPF) via an Sx interface. The method (500) comprising transmitting (S501) a message associated with a Packet Detection Rule (PDR) to the second network node (302) via the Sx interface, wherein the PDR is applicable to more than one Sx session. With embodiments herein, the
(Continued)

CPF-UPF signaling throughput can be minimized significantly, and the memory footprint per Sx session can be decreased.

18 Claims, 5 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2018/0132141 A1* | 5/2018 | Huang-Fu | H04W 36/30 |
| 2019/0158408 A1* | 5/2019 | Li | H04L 47/20 |
| 2019/0182385 A1* | 6/2019 | Yan | H04M 15/65 |

OTHER PUBLICATIONS

Nokia et al. "Controlling the UP to buffer, drop or duplicate data packets" SA WG2 Meeting #117, Kaohsiung City, Taiwan, S2-166176, Oct. 17-21, 2016, 7 pages.

Huawai "Pseudo-CR on Removal of the Editor's Notes for Usage monitoring and charging" 3GPP TSG CT4 Meeting #78, Zhangjiajie, China, C4-173265, May 15-19, 2017, 4 pages.

Nokia et al. "Pseudo-CR on Lawful interception support" 3GPP TSG CT4 Meeting #76, Dubrovnik, Croatia, C4-171268, Feb. 13-17, 2017, 17 pages.

NEC "Pseudo-CR on N4 requirement to deactivate UP connection when UPF detects that the PDU Session has no data activity" 3GPP TSG CT4 Meeting #81, Reno, US, C4-176077, Nov. 27-Dec. 1, 2017, 10 pages.

3GPP, 3rd Generation Partnership Project; Technical Specification Group Core Network and Terminals; Interface between the Control Plane and the User Plane of EPC Nodes; Stage 3 (Release 14), 3GPP TS 29.244, V14.1.0 (Sep. 2017), 146 pages.

3GPP, 3rd Generation Partnership Project; Technical Specification Group Services and System Aspects; Architecture enhancements for control and user plane separation of EPC Nodes; Stage 2 (Release 14), 3GPP TS 23.214, V14.2.0 (Mar. 2017), 78 pages.

3GPP, 3rd Generation Partnership Project; Technical Specification Group Core Network and Terminals; Interface between the Control Plane and the User Plane Nodes; Stage 3 (Release 14), 3GPP TS 29.244, V14.2.0 (Dec. 2017), 156 pages.

Huawai "Update of the TS to prepare it for 5GC/N4" 3GPP TSG CT4 Meeting #80, Kochi, India, C4-175385, Oct. 23-27, 2017, 81 pages.

Ericsson "Node PDR support for Group/All Sessions" 3GPP TSG CT4 Meeting #83, C4-182144, Montreal, Canada; Feb. 26-Mar. 2, 2018, 22 pages.

* cited by examiner

|  | Bits | | | | | | | |
|---|---|---|---|---|---|---|---|---|
| Octets | 8 | 7 | 6 | 5 | 4 | 3 | 2 | 1 |
| 1 to 2 | Type = 117 (decimal) | | | | | | | |
| 3 to 4 | Length = n | | | | | | | |
| 5 to 6 | Rule ID | | | | | | | |
| 7 to (n+4) | These octet(s) is/are present only if explicitly specified | | | | | | | |

Figure 10

|  | Bits | | | | | | | |
|---|---|---|---|---|---|---|---|---|
| Octets | 8 | 7 | 6 | 5 | 4 | 3 | 2 | 1 |
| 1 to 2 | Type = 118 (decimal) | | | | | | | |
| 3 to 4 | Length = n | | | | | | | |
| 5 | Grouped Session Identity | | | | | | | |
| 6 to (n+4) | These octet(s) is/are present only if explicitly specified | | | | | | | |

Figure 11

SX PROTOCOL EXTENSION TO SUPPORT NODE PDR

CROSS REFERENCE TO RELATED APPLICATION(S)

This application is a 35 U.S.C. § 371 National Phase Entry Application from PCT/CN2019/075136, filed Feb. 15, 2019, designating the United States, and also claims the benefit of International Application No. PCT/CN2018/076914, filed Feb. 15, 2018, the disclosures of which are incorporated herein by reference in their entirety.

TECHNICAL FIELD

The embodiments herein relate generally to the field of communication, and more particularly, the embodiments herein relate to Sx protocol extension to support node PDR.

BACKGROUND

The third Generation Partnership Project (3GPP) Technical Specification TS 23.214 v14.2.0, which is incorporated herein by reference, specifies the overall stage 2 level functionality for control and user plane separation of Evolved Packet Core (EPC)'s Serving Gateway (SGW), Packet Data Network Gateway (PGW), and Traffic Detection Function (TDF). This enables a flexible placement of the separated control plane and user plane functions for supporting diverse deployment scenarios (e.g. central or distributed user plane function) without affecting the overall functionality provided by these EPC entities.

FIG. 1 is a schematic block diagram showing the architecture reference model in the case of separation between control plane and user plane. This architecture reference model covers non-roaming as well as home routed and local breakout roaming scenarios.

Furthermore, the usage of a combined SGW/PGW remains possible in a deployment with separated control and user planes. This is enabled by supporting an Sx interface with a common parameter structure for non-combined and combined cases. FIG. 2 is a schematic block diagram showing the architecture reference model for a combined SGW/PGW in the case of separation between control plane and user plane.

Besides, 3GPP TS 29.244 v14.1.0, which is incorporated herein by reference, specifies the Packet Forwarding Control Protocol (PFCP) used on the interface between the control plane and the user plane function in a split SGW, PGW and TDF architecture in EPC. Sx protocol (PFCP) detailed in 3GPP TS 29.244 v14.1.0 provides a standard interface where a Control Plane (CP) can instruct a User Plane (UP) with the applicable Packet Detection Rules (PDRs), Forwarding Action Rule (FAR)-ID, Usage Reporting Rule (URR)-ID, Quality of Service Enforcement Rule (QER)-ID, . . . on per Sx session basis.

SUMMARY

In 3GPP TS 29.244 v14.1.0, the PDR is instructed by CP to UP on per Sx session basis. Thus, when a user session is requested to be started, the Control Plane (CP) will forward to the User Plane (UP) all the PDRs applicable to the traffic, which this user will generate along the session. Packets for this user session will be matching the different PDRs for the Sx session and needed actions will be taken for the packets according to the rules (FAR, QER, URR, . . . ) linked to the PDR matched.

This means that the UP will handle a big amount of Sx sessions, where each of these Sx sessions will handle a list of PDRs.

There are scenarios in which, on top of the ongoing and active Sx sessions, CP will need to instruct with a PDR that is applicable to all the Sx sessions or applicable to a group of Sx sessions. To achieve it, considering 3GPP TS 29.244 v14.1.0, it will imply:

to trigger an Sx Session Modification procedure for each of the active Sx Session. Each of these Sx Session Modification procedures will include exactly the same and new PDR.

to add this new PDR in every new Sx Session establishment procedure.

This is not optimal from CP-UP Sx signaling point of view, as an Sx Session Modification procedure with the same PDR has to be sent by the CP to the UP as many times as active Sx sessions, and it is not optimal from UP memory point of view as the same PDR (with the same information) will have to be stored in all active Sx sessions and new Sx sessions.

As an example, following scenarios will be subject to be handled with the procedure stated above, where the same PDR will have to be provisioning to all existing and new Sx sessions:

any TCP signaling (either setup and/or teardown) to be charged with a special rate;

any TCP retransmitted packets, to be free of charge;

any tethering traffic, to be charge with a different rate;

traffic matching a default catch-all filter which will be charged in the same rate, and so on.

In view of the above typical case, the embodiments herein propose to optimize the way a CP shall instruct a PDR that it is applicable to all active Sx sessions, a group of Sx sessions, or the new Sx session to be created.

In one embodiment, there proposes a method in a first network node configured as control plane function (CPF), the first network node is coupled to a second network node configured as user plane function (UPF) via an Sx interface, the method comprising: transmitting a message associated with a PDR to the second network node via the Sx interface, wherein the PDR is applicable to more than one Sx session.

In another embodiment, there proposes a method in a second network node configured as UPF, the second network node is coupled to a first network node configured as CPF via an Sx interface, the method comprising: receiving a message associated with a PDR from the first network node via the Sx interface, wherein the PDR is applicable to more than one Sx session.

In yet another embodiment, there proposes a first network node configured as CPF, the first network node is coupled to a second network node configured as UPF via an Sx interface, the first network node comprising: at least one processor; and a non-transitory computer readable medium coupled to the at least one processor, the non-transitory computer readable medium contains instructions executable by the at least one processor, whereby the at least one processor is configured to: transmit a message associated with a PDR to the second network node via the Sx interface, wherein the PDR is applicable to more than one Sx session.

In yet another embodiment, there proposes a second network node configured as UPF, the second network node is coupled to a first network node configured as CPF via an Sx interface, the second network node comprising: at least one processor; and a non-transitory computer readable medium coupled to the at least one processor, the non-transitory computer readable medium contains instructions executable by the at least one processor, whereby the at least one processor is configured to: receive a message associated with a PDR from the first network node via the Sx interface, wherein the PDR is applicable to more than one Sx session.

In yet another embodiment, there proposes a computer readable medium comprising computer readable code, which when run on an apparatus, causes the apparatus to perform any of the above methods.

With embodiments herein, which support PDRs applicable to all active Sx sessions or a group of Sx sessions, the CPF-UPF signaling throughput can be minimized significantly, and the memory footprint per Sx session can be decreased.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which:

FIG. 10 shows an information element according to the embodiments, herein.

FIG. 11 shows an information element according to the embodiments, herein.

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

The term "A, B, or C" used herein means "A" or "B" or "C"; the term "A, B, and C" used herein means "A" and "B" and "C"; the term "A, B, and/or C" used herein means "A", "B", "C", "A and B", "A and C", "B and C" or "A, B, and C".

The embodiments herein propose a new Sx node related procedure that will be used by the CP to instruct the UP those PDRs that are applicable to all active Sx sessions or to a group of Sx Sessions. The PDRs instructed by the CP will be handled by UP in a separate way to the traditional PDRs instructed per Sx session.

Figure 1:
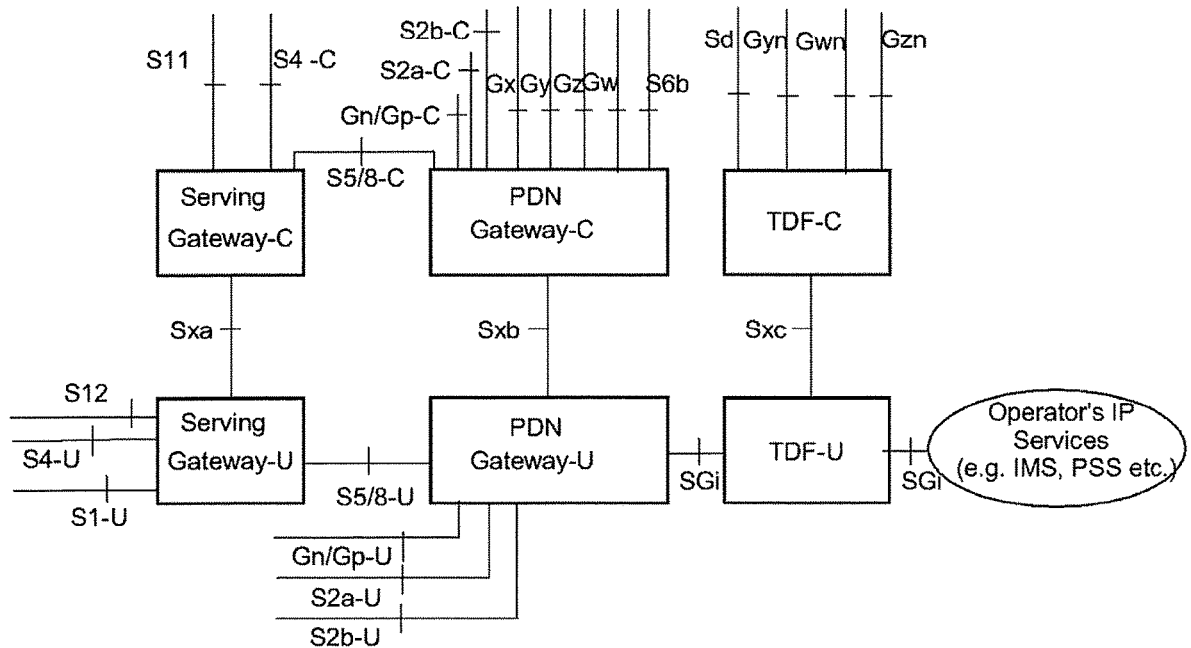
FIG. 1 is a schematic block diagram showing the architecture reference model in the case of separation between control plane and user plane.
Figure 2:
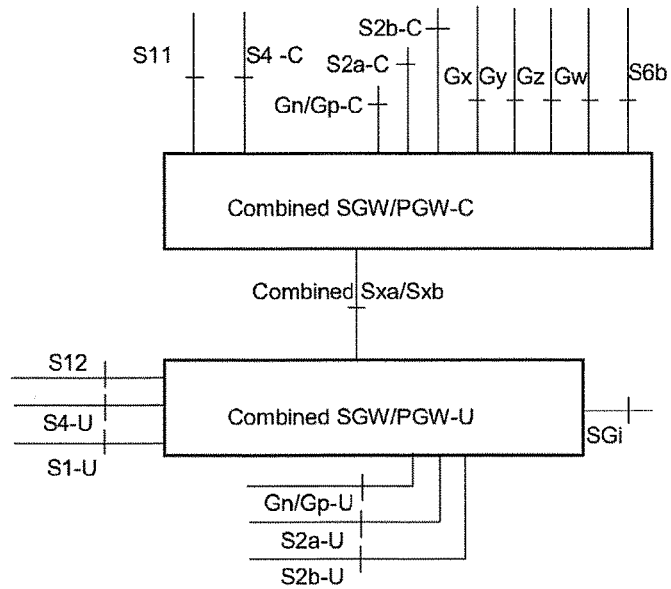
FIG. 2 is a schematic block diagram showing the architecture reference model for a combined SGW/PGW in the case of separation between control plane and user plane.
Figure 3:
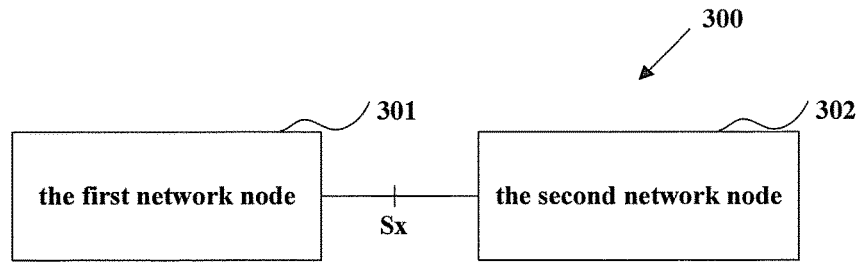
FIG. 3 is a schematic block diagram showing an example communication system, in which the embodiments herein may be implemented.

FIG. 3 is a schematic block diagram showing an example communication system 300, in which the embodiments herein may be implemented.

In one embodiment, the communication system 300 may include but not limit to a first network node 301 and a second network node 302. The first network node 301 may be configured as control plane function, which also may be referred as CPF, CP function, or CP. The second network node 302 may be configured as user plane function, which also may be referred as UPF, UP function, or UP. The first network node 301 and the second network node 302 may be coupled to each other via an interface, which may be referred as Sx interface or Sx reference point.

In one embodiment, the first network node 301 may be configured as SGW CPF (SGW-C), the second network node 302 may be configured as SGW UPF (SGW-U), and the Sx interface may be Sxa interface between SGW-C and SGW-U.

In another embodiment, the first network node 301 may be configured as PGW CPF (PGW-C), the second network node 302 may be configured as PGW UPF (PGW-U), and the Sx interface may be Sxb interface between PGW-C and PGW-U.

In yet another embodiment, the first network node 301 may be configured as TDF CPF (TDF-C), the second network node 302 may be configured as TDF UPF (TDF-U), and the Sx interface may be Sxc interface between TDF-C and TDF-U.

In still yet another embodiment, the first network node 301 may be configured as combined SGW/PGW CPF (SGW/PGW-C), the second network node 302 may be configured as combined SGW/PGW UPF (SGW/PGW-U), and the Sx interface may be combined Sxa/Sxb interface between SGW/PGW-C and SGW/PGW-U.

To solve the problem in the prior art, the following embodiments are proposed at Sx procedure level and at traffic level.

Sx Procedures Level

A new procedure, for example Sx Node PDR Management Request and Response procedure, is proposed to be used by CP and UP for those scenarios where a PDR is applicable to all active Sx sessions or a group of Sx sessions, i.e., applicable to more than one Sx session. Note that, the proposed PDR type may be referred as node PDR or Node PDR whilst the standardized PDR may be referred as Sx session PDR.

Within Sx Node PDR Management Request message, the following Information Elements (IEs) are needed to be instructed by CP (e.g., the first network node 301):

the node PDR information. This PDR will have most of the IEs than an Sx session PDR, but:

There is no CP F-SEID IE, UP F-SEID IE, .etc which are used to identify the Sx session, since the Node PDR is applicable to more than one Sx session;

Relevant rules (FAR, QER, URR) identity linked to any Node PDR can also be linked from an Sx session PDR, meaning that there will not be a kind of Node FAR, Node QER, New IE, NodePDRId, is used to uniquely identify the Node PDR among all the other Node PDRs;

New IE, GroupedSessionIdentity, is used to specify to which Sx sessions the Node PDR is applicable. A specific value (e.g., 0) can be used to indicate that the Node PDR is applicable to all the Sx sessions.

Within Sx Node PDR Management Request message, CP function (e.g., the first network node 301) will provide any change(s), such as:

Add new Node PDR(s);
Change any field on existing Node PDR(s);
Remove existing Node PDR(s).

Within Sx Node PDR Management Response message, UP function (e.g., the second network node 302) will response "successful" if related actions are completed finely, otherwise the response will be "unsuccessful".

Moreover, it is also needed a change in existing Sx session procedures to handle properly already mentioned GroupedSessionIdentity IE. Therefore, CP function will provide the GroupedSessionIdentity IE in the following procedure:

Sx Session Establishment Request procedure, to indicate if this Sx session is included in a GroupedSessionIdentity.

Sx Session Modification Request procedure, to indicate any modification related with GroupedSessionIdentity IE for this Sx session.

GroupedSessionIdentity IE is applicable on per Sx session and UP function will store this IE together with the rest of information for this Sx session.

It shall be upto the CP to define what is behind each of the GroupedSessionIdentity. As an example, one GroupedSessionIdentity can group all subscribers related with electric metering devices, so that each time an Sx session is established for any of these subscriptions, the right GroupedSessionIdentity shall be sent in any of these Sx Session Establishment procedures.

Alternative Sx Procedure Level

Alternatively, the above Sx procedure level may be embodied in three separate procedures:

Sx Node PDR Establishment Request and Response procedure

Sx Node PDR Modification Request and Response procedure

Sx Node PDR Deletion Request and Response procedure.

Within Sx Node PDR Establishment Request procedure, following IEs are needed to be instructed by CP:

the Node PDR(s) information. This PDR will have most of the IEs of an Sx session PDR, but:

There is no IEs such as CP F-SEID IE, UP F-SEID IE, .etc which are used to identify the Sx session, since the Node PDR is applicable to more than one Sx session.

Precedence for a Node PDR will be applicable among the rest of the Node PDRs together with session PDRs.

Relevant rules (FAR, QER, URR) identity linked to any Node PDR can also be linked from an Sx session PDR, meaning that there will not be a kind of Node FAR, Node QER, New IE, NodePDRApplicability, to specify is the Node PDR is applicable to all Sx Sessions or the Node PDR is only applicable to a group of Sx sessions.

When the Node PDR is applicable to a group of Sx sessions, another new IE, GroupedSessionIdentity, has to be instructed from CP. This may be understood as an identifier that will allow UPF to know to which Sx Sessions this Node PDR will apply.

Within Sx Node PDR Modification Request procedure, CP function will provide any change on an already existing Node PDR(s) like:

Change on any field under PDR IE
Change on NodePDRApplicability IE
Change on GroupedSessionIdentity IE.

Within Sx Node PDR Deletion Request procedure, CP function will provide the Node PDR(s) to be deleted.

For these new three procedures, UP function will response "successful" if related actions are completed finely, otherwise, response will be "unsuccessful".

Traffic Level

Figure 4:
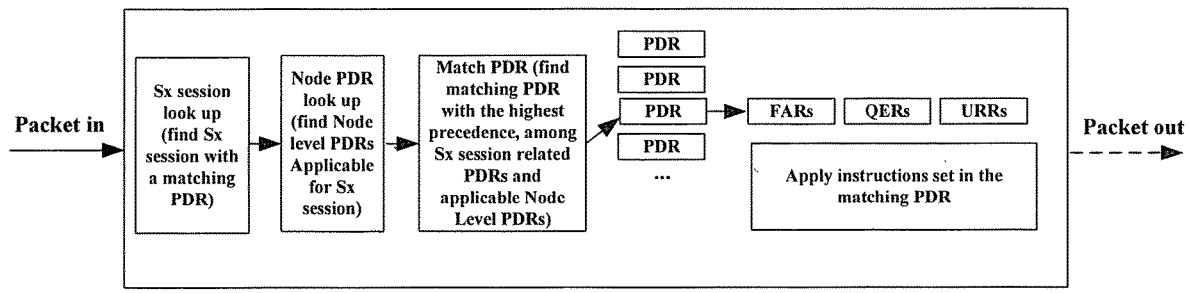
FIG. 4 is a schematic flow chart showing an example packet processing flow in the second network node, according to the embodiments herein.

FIG. 4 is a schematic flow chart showing an example packet processing flow in the second network node 302, according to the embodiments herein.

For the payload traffic, it must be considered that:

All Node PDRs will have their own precedence and they shall be evaluated together with session level PDR(s).

Along all Node PDRs, there could be Node PDR(s) applicable to all Sx sessions and Node PDR(s) applicable to a group of Sx sessions.

Therefore, when a payload packet is received in the UP, the following actions will be executed in the order described below:

Sx session lookup is performed, to identify an Sx session to which a received user plane packet corresponds.

When Sx session is known, it will be checked if any Node PDR(s) is applicable to this Sx session. In one embodiment, one or more node PDRs applicable to the Sx session are found.

If any, Node PDRs will be evaluated in precedence order together with session level PDR(s). In one embodiment, the one or more node PDRs together with a session level PDR are evaluated in decreasing order of precedence, and the first matched PDR is selected.

Apply instruction sets in the selected PDR, i.e., the first matched PDR.

As described above, the embodiments herein provide a new level of PDR, i.e., Node PDR. This PDRs type are defined to be applied to all Sx sessions or a group of Sx sessions.

By the embodiments herein, the following technical effects may be achieved:

minimizing significantly the CP-UP signaling throughput, as there is no need to provide repeatedly a plurality of identical PDRs for a plurality of applicable Sx sessions (i.e., one node PDR may be enough); and decreasing the memory footprint per Sx session, as there is no need to store repeatedly a plurality of identical PDRs for a plurality of applicable Sx sessions (i.e., one node PDR may be enough).

Figure 5:
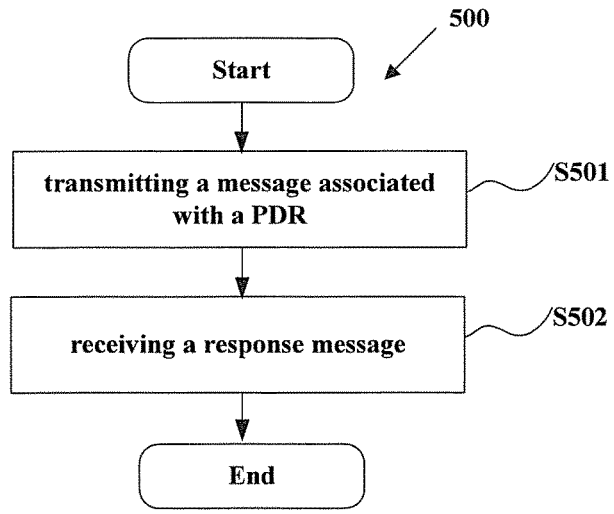
FIG. 5 is a schematic flow chart showing an example method in the first network node, according to the embodiments herein.

FIG. 5 is a schematic flow chart showing an example method 500 in the first network node, according to the embodiments herein. In one embodiment, the flow chart in FIG. 5 can be implemented in the first network node 301 in FIG. 3.

The method 500 may begin at step S501, in which the first network node 301 may transmit a message associated with a PDR to the second network node 302, wherein the PDR may be applicable to more than one Sx session. The PDR is a node PDR, which is distinguishable from the traditional Sx session level PDR (the traditional Sx session PDR needs IE to identify an Sx session).

In one embodiment, the first network node 301 (CPF) initiates the Sx Node PDR Management procedure to create a new Node PDR or to modify/delete an existing Node PDR. The CPF shall provide all the new, updated or deleted Rules. The updated Rules shall contain only the information which is to be changed, added and/or deleted.

In one embodiment, the node PDR may include a NodePDRId IE to identify the node PDR among all the other PDRs. An example NodePDRId IE may be coded as the form shown in FIG. 10. In FIG. 10, octets 5 to 6 contain the Rule ID and shall be encoded as an integer.

Furthermore, the node PDR may also include a GroupedSessionIdentity IE to identify a session group to which the node PDR is applicable. For the node PDR applicable to all Sx sessions, the GroupedSessionIdentity IE may be set to a specific value, for example 0. An example GroupedSessionIdentity IE may be coded as the form shown in FIG. 11. In FIG. 11, the Grouped Session Identity value shall be encoded as Octet string. Note that, the Grouped Session Identity value "0" represents all sessions on the Node.

In one embodiment, the node PDR may also include a precedence IE to indicate its precedence when being applied by the second network node 302. Furthermore, the node PDR may include an indication of action (or rule) to be performed by the second network node 302.

In one embodiment, the message may be an Sx Node PDR Management Request message. An example Sx Node PDR Management Request message may be the following form:

| Information elements | P | Condition/Comment | Appl. Sxa | Sxb | Sxc | IE Type |
|---|---|---|---|---|---|---|
| Node ID | M | This IE shall contain the unique identifier of the sending Node. | X | X | X | Node ID |
| Remove Node TOR | C | When present, this IE shall contain the PDR Rule which is requested to be removed. Several IEs within the same IE type may be present to represent a list of PDRs to remove. | X | X | X | Remove Node PDR |
| Remove FAR | C | When present, this IE shall contain the FAR Rule which is requested to be removed. Several IEs within the same IE type may be present to represent a list of FARs to remove. | X | X | X | Remove FAR |
| Remove URR | C | When present, this shall contain the URR Rule which is requested to be removed. Several IEs within the same IE type may be present to represent a list of URRs to remove. | X | X | X | Remove URR |
| Remove QER | C | When present, this IE shall contain the QER Rule which is requested to be removed. Several IEs within the same IE type may be present to represent a list of QERs to remove. | — | X | X | Remove QER |
| Remove BAR | C | When present, this IE shall contain the BAR Rule which is requested to be removed. | X | — | — | Remove BAR |
| Create Node PDR | C | This IE shall be present if the CP function requests the UP function to create a new Node PDR. Several IEs within the same IE type may be present to represent a list of PDRs to create. | X | X | X | Create Node PDR |
| Create FAR | C | This IE shall be present if the CP function requests the UP function to create a new FAR. Several IEs within the same IE type may be present to represent a list of FARs to create. | X | X | X | Create FAR |
| Create URR | C | This IE shall be present if the CP function requests the UP function to create a new URR. Several IEs within the same IE type may be present to represent a list of URRs to create. | X | X | X | Create URR |
| Create QER | C | This IE shall be present if the CP function requests the UP function to create a new QER. Several IEs within the same IE type may be present to represent a list of QERs to create. | — | X | X | Create QER |
| Create BAR | C | This IE shall be present if the CP function requests the UP function to create a new BAR. | X | — | — | Create BAR |
| Update Node PDR | C | This IE shall be present if a Node PDR previously created need to be modified. Several IEs within the same IE type may be present to represent a list of PDRs to update. | X | X | X | Update Node PDR |
| Update FAR | C | This is IE shall be present if a FAR previously created for the Sx session need to be modified. Several IEs within the same IE type may be present to represent a list of FARs to update. | X | X | X | Update FAR |
| Update URR | C | This IE shall be present if URR(s) previously created for the Sx session need to be modified. Several IEs within the same IE type may be present to represent a list of modified URRs. Previously URRs that are not modified shall not be included. | X | X | X | Update URR |
| Update QER | C | This IE shall be present if QER(s) previously created for the Sx session need to be modified. Several IEs within the same IE type may be present to represent a list of modified QERs. Previously created QERs that are not modified shall not be included. | — | X | X | Update QER |

| Information elements | P | Condition/Comment | Appl. Sxa | Sxb | Sxc | IE Type |
|---|---|---|---|---|---|---|
| Update BAR | C | This IE shall be present if a BAR previously created for the Sx session needs to be modified.<br>A previously created BAR that is not modified shall not be included. | X | — | — | Update BAR |

In the Sx Node PDR Management Request message, the first network node 301 may instruct the second network node 302 to: add a node PDR; change a field on a node PDR; and/or remove a node PDR.

An example Create Node PDR IE can be the following form:

Octet 1 and 2 — Create Node PDR IE Type = 1(decimal)
Octets 3 and 4 — Length = n

| Information elements | P | Condition/Comment | Appl. Sxa | Sxb | Sxc | IE Type |
|---|---|---|---|---|---|---|
| Node PDR ID | M | This is IE shall uniquely identify the Node PDR among all the Node level PDRs. | X | X | X | Node PDR ID |
| Grouped Session Identity | M | This IE shall identify the session group to which the Node PDR is applicable.<br>Grouped Session Identity value "0" indicates the Node PDR shall be applicable for all sessions. | X | X | X | Grouped Session Identity |
| Precedence | M | This IE shall indicate the Node PDR's precedence to be applied by the UP function among all Nodes, when looking for a PDR matching an incoming packet. | — | X | X | Precedence |
| PDI | M | This is IE shall contain the PDI against which incoming packets will be matched. | X | X | X | PDI |
| Outer Header Removal | C | This is IE shall be present if the UP function is required to remove one or more outer header(s) from the packets matching this PDR. | X | X | — | Outer Header Removal |
| FAR ID | C | This IE shall be present if the Activate Predefined Rules IE is not included or if it is included but it does not result in activating a predefined FAR.<br>When present this IE shall contain the FAR ID to be associated to the PDR. | X | X | X | FAR ID |
| URR ID | C | This is IE shall be present if a measurement action shall be applied to packets matching this PDR.<br>When present, this IE shall contain the URR IDs to be associated to the PDR.<br>Several IEs within the same IE type may be present to represent a list of URRs to be associated to the PDR. | X | X | X | URR ID |
| QER ID | C | This IE shall be present if a QoS enforcement action shall be applied to packets matching this PDR.<br>When present, this IE shall contain the QER IDs to be associated to the PDR. Several IEs within the same IE type may be present to represent a list of QERs to be associated to the PDR. | — | X | X | QER ID |
| Activate Predefined Rules | C | This IE shall be present if Predefined Rule(s) shall be activated for this PDR. | — | X | X | Activate Predefined Rules |

An example PDI IE can be the following form:

Octet 1 and 2 — PDI IE Type = 2 (decimal)
Octets 3 and 4 — Length = n

| Information elements | P | Condition/Comment | Appl. Sxa | Sxb | Sxc | IE Type |
|---|---|---|---|---|---|---|
| Source Interface | M | This IE shall identify the source interface of the incoming packet. | X | X | X | Source Interface |
| Network Instance | O | If present, this IE shall identify the Network instance to match for the incoming packet. See NOTE 1. | X | X | X | Network Instance |
| UE IP address | O | If present, this IE shall identify the source or destination IP address to match for the incoming packet. | — | X | X | UE IP address |

| Octet 1 and 2 | | PDI IE Type = 2 (decimal) | | | | |
| --- | --- | --- | --- | --- | --- | --- |
| Octets 3 and 4 | | Length = n | | | | |
| Information | | | | Appl. | | |
| elements | P | Condition/Comment | Sxa | Sxb | Sxc | IE Type |
| SDF Filter | O | If present, this IE shall identify the SDF filter to match for the incoming packet. | — | X | X | SDF Filter |
| Application ID | O | If present, this IE shall identify the Application ID to match for the incoming packet. | — | X | X | Application ID |

NOTE 1:
The Network Instance parameter is needed e.g. in the following cases:
PGW/TDF UP function supports multiple PDNs with overlapping IP addresses;
SGW UP function is connected to PGWs in different IP domains (S5/S8);
PGW UP function is connected to SGWs in different IP domains (S5/S8);
SGW UP function is connected to eNodeBs m different IP domains.

An example Update Node PDR IE can be the following form:

| Octet 1 and 2 | | Update PDR IE Type = 9 (decimal) | | | | |
| --- | --- | --- | --- | --- | --- | --- |
| Octets 3 and 4 | | Length = n | | | | |
| Information | | | | Appl. | | |
| elements | P | Condition/Comment | Sxa | Sxb | Sxc | IE Type |
| Node PDR ID | M | This IE shall uniquely identify the Node PDR among all the NodePDRs. | X | X | X | Node PDR ID |
| Grouped Session Identity | C | This IE shall be present if the Node PDR is applicable to a different session group. Grouped Session Identity value "0" indicates the Node PDR shall be applicable for all sessions. | X | X | X | Grouped Session Identity |
| Outer Header Removal | C | This IE shall be present if it needs to be changed. | X | X | — | Outer Header Removal |
| Precedence | C | This IE shall be present if there is a change in the Node PDR's precedence to be applied by the UP function among all Node PDRs, when looking for a PDR matching an incoming packet. | — | X | X | Precedence |
| PDI | C | This IE shall be present if there is a change within the PDI against which incoming packets will be matched. When present, this IE shall replace the PDI previously stored in the UP function for this PDR. | X | X | X | PDI |
| FAR ID | C | This IE shall be present if it needs to be changed | X | X | X | FAR ID |
| URR ID | C | This IE shall be present if a measurement action shall be applied or no longer applied to packets matching this PDR. When present, this IE shall contain the list of all the URR IDs to be associated to the PDR. | X | X | X | URR ID |
| QER ID | C | This IE shall be present if a QoS enforcement action shall be applied or no longer applied to packets matching this PDR. When present, this IE shall contain the list of all the QER IDs to be associated to the PDR. | — | X | X | QER ID |
| Activate Predefined Rules | C | This IE shall be present if new Predefined Rule(s) needs to be activated for the PDR. | — | X | X | Activate Predefined Rules |
| Deactivate Predefined Rules | C | This IE shall be present if Predefined Rule(s) needs to be deactivated for the PDR | — | X | X | Deactivate Predefined Rules |

NOTE:
The IEs which do not need to be modified shall not be included in the Update PDR IE. The UP function shall continue to behave according to the values previously received for IEs not present in the Update PDR IE.

In one embodiment, the first network node 301 instructs the GroupedSessionIdentity IE in the following procedure:
  Sx Node PDR Management Request procedure, to indicate to which Sx sessions the node PDR will apply;
  Sx Session Establishment Request procedure, to indicate if the Sx session is included in a GroupedSessionIdentity; and
  Sx Session Modification Request procedure, to indicate any modification related with GroupedSessionIdentity IE for the Sx session.

Then, the method 500 may proceed to step S502, in which the first network node 301 may receive an Sx Node PDR Management Response message from the second network node 302 to indicate whether the Sx Node PDR Management Request message is accepted or rejected.

In one embodiment, when the first network node 301 (CPF) receives an Sx Node PDR Management Response with the cause "success", it shall continue with the procedure which has initiated the Sx Node PDR Management procedure.

The above steps are only examples, and the first network node 301 can perform any actions described in connection to FIG. 3, to manage the node PDR, by for example Sx Node PDR Management Request and Response procedure.

Figure 6:
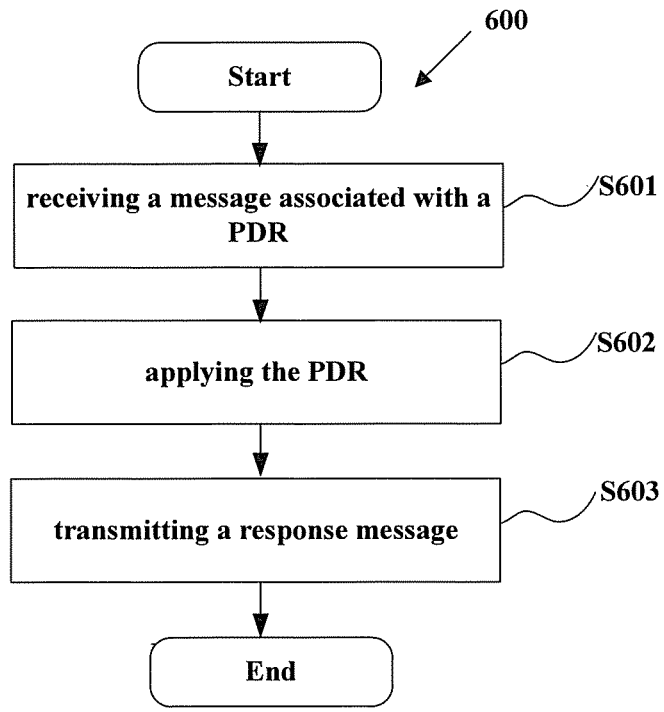
FIG. 6 is a schematic flow chart showing an example method in the second network node, according to the embodiments herein.

FIG. 6 is a schematic flow chart showing an example method 600 in the second network node, according to the embodiments herein. In one embodiment, the flow chart in FIG. 6 can be implemented in the second network node 302 in FIG. 3.

The method 600 may begin at step S601, in which the second network node 302 may receive a message associated with a PDR from the first network node 301, wherein the PDR is applicable to more than one Sx session. The PDR is a node PDR, which is distinguishable from the traditional Sx session level PDR (the traditional Sx session PDR needs IE to identify an Sx session).

In one embodiment, the node PDR may include a NodePDRId IE to identify the node PDR among all the other PDRs. Furthermore, the node PDR may also include a GroupedSessionIdentity IE to identify a session group to which the node PDR is applicable. For the node PDR applicable to all Sx sessions, the GroupedSessionIdentity IE may be set to a specific value, for example 0. In one embodiment, the node PDR may also include a precedence IE to indicate its precedence when being applied by the second network node 302. Furthermore, the node PDR may include an indication of action (or rule) to be performed by the second network node 302.

In one embodiment, the message may be an Sx Node PDR Management Request message. In the Sx Node PDR Management Request message, the first network node 301 may instruct the second network node 302 to: add a node PDR; change a field on a node PDR; and/or remove a node PDR.

Then, the method 600 may proceed to step S602, in which the second network node 302 may apply the node PDR to more than one Sx session. In one embodiment, when applying the node PDR, the second network node 302 may perform the following actions:

performing Sx session lookup, to identify an Sx session to which an received user plane packet corresponds;
 finding one or more node PDR applicable to the Sx session;
 selecting the first PDR matching to the received user plane packet among the one or more node PDR together with a session level PDR in decreasing order of precedence; and
 triggering the action(s) related to the PDR selected.

A packet matches a PDR if all the match fields of the Packet Detection Information (PDI) of the PDR are matching the corresponding packet header fields. If a match field is not included in the PDI, it shall be considered as matching all possible values in the header field of the packet. If the match field is present and does not include a mask, the match field shall be considered as matching the corresponding header field of the packet if it has the same value. If the match field is present and includes a mask (e.g. IP address with a prefix mask), the match field shall be considered as matching the corresponding header field of the packet if it has the same value for the bits which are set in the mask.

In one embodiment, the precedence of the one or more node PDR is higher than the precedence of the session level PDR, so that the node PDR is considered firstly. The second network node 302 (UPF) may drop packets unmatched with any PDR(s).

Then, the method 600 may proceed to step S603, in which the second network node 302 may transmit an Sx Node PDR Management Response message to the first network node 302 to indicate whether the Sx Node PDR Management Request message is accepted or rejected. Note that, the above steps S602 and S603 can be performed in any sequence, performed at the same time, or performed separately.

In one embodiment, the second network node 302 may perform respective action(s) as instructed by the first network node 301, for example, the second network node 302 may add a node PDR; change a field on a node PDR; and/or remove a node PDR. If the second network node 302 completes the actions finely, it will send Sx Node PDR Management Response message to indicate that the Sx Node PDR Management Request message is accepted. Otherwise, the second network node 302 may send Sx Node PDR Management Response message to indicate that the Sx Node PDR Management Request message is rejected and the reason(s) why this message is rejected.

In one embodiment, when the second network node 302 (UPF) receives an Sx Node PDR Modification Request, it shall:

update and apply the rules received in the request and send an Sx Node PDR Management Response with cause "success", if all rules in the Sx Node PDR Management Request are accepted and applied;
 Otherwise, if at least one rule failed to be updated or applied, return an appropriate error cause value with the Rule ID of the Rule causing the first error, discard all the received rules.

An example Sx Node PDR Management Response message can be the following form:

| Information elements | P | Condition/Comment | Appl. Sxa | Sxb | Sxc | IE Type |
|---|---|---|---|---|---|---|
| Node ID | M | This IE shall contain the unique identifier of the sending Node. | X | X | X | Node ID |
| Cause | M | This IE shall indicate the acceptance or the rejection of the corresponding request message. | X | X | X | Cause |
| Offending IE | C | This IE shall be included if the rejection is due to a conditional or mandatory IE missing or faulty. | X | X | X | Offending IE |
| Failed Rule ID | C | This IE shall be included if the Cause IE indicates a rejection due to a rule creation or modification failure. | X | X | X | Failed Rule ID |

The above steps are only examples, and the second network node 302 can perform any actions described in connection to FIGS. 3-4, to manage the node PDR, by for example Sx Node PDR Management Request and Response procedure, and to apply the node PDR to the received packet.

Figure 7:
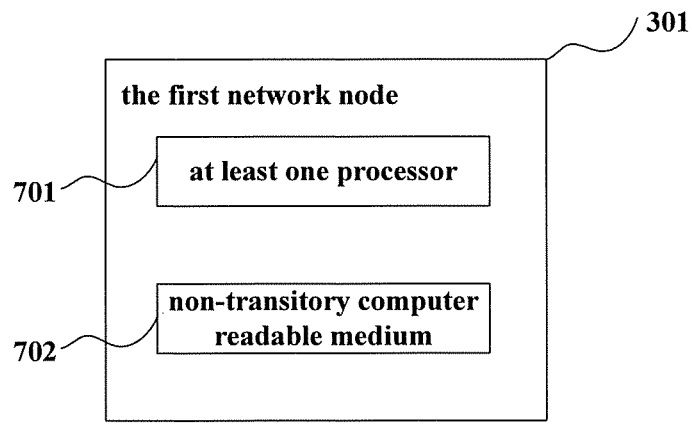
FIG. 7 is a schematic block diagram showing an example first network node, according to the embodiments herein.

FIG. 7 is a schematic block diagram showing an example first network node 301, according to the embodiments herein.

In one embodiment, the first network node 301 may include at least one processor 701; and a non-transitory computer readable medium 702 coupled to the at least one processor 701. The non-transitory computer readable medium 702 contains instructions executable by the at least one processor 701, whereby the at least one processor 701 is configured to perform the steps in the example method 500 as shown in the schematic flow chart of FIG. 5; the details thereof is omitted here.

Note that, the first network node 301 can be performed as hardware, software, firmware and any combination thereof. For example, the first network node 301 may include a plurality of units, circuities, or modules, each of which can be used to perform a step of the example method 500 or any step shown in FIG. 3-4 related to the first network node 301.

Figure 8:
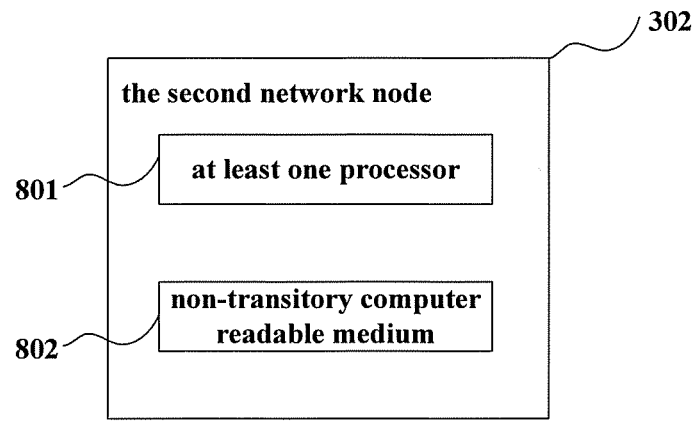
FIG. 8 is a schematic block diagram showing an example second network node, according to the embodiments herein.

FIG. 8 is a schematic block diagram showing an example second network node 302, according to the embodiments herein.

In one embodiment, the second network node 302 may include at least one processor 801; and a non-transitory computer readable medium 802 coupled to the at least one processor 801. The non-transitory computer readable medium 802 contains instructions executable by the at least one processor 801, whereby the at least one processor 801 is configured to perform the steps in the example method 600 as shown in the schematic flow chart of FIG. 6; the details thereof is omitted here.

Note that, the second network node 302 can be performed as hardware, software, firmware and any combination thereof. For example, the second network node 302 may include a plurality of units, circuities, or modules, each of which can be used to perform a step of the example method 600 or any step shown in FIG. 3-4 related to the second network node 302.

Figure 9:
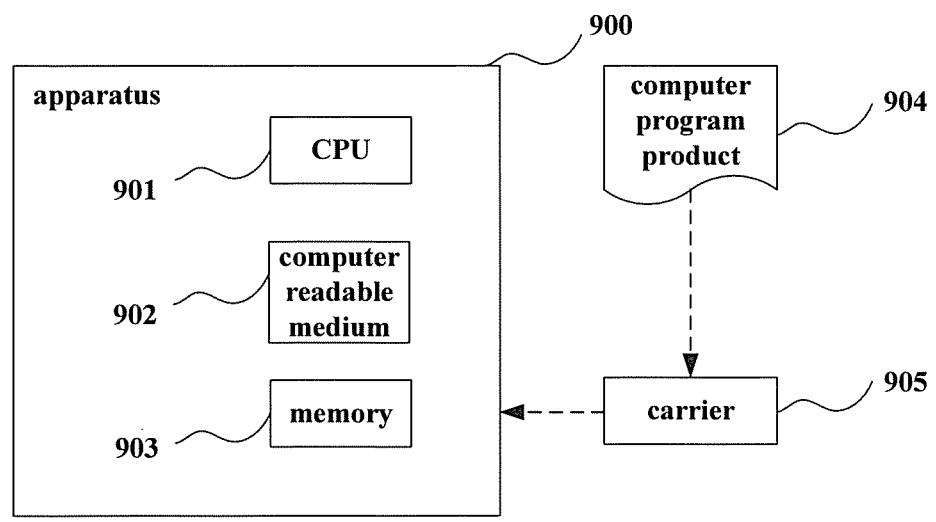
FIG. 9 is a schematic block diagram showing an apparatus, according to the embodiments herein.

FIG. 9 is a schematic block diagram showing an apparatus 900, according to the embodiments herein. In one embodiment, the apparatus 900 can be configured as the above mentioned apparatus, such as the first network node 301 or the second network node 302.

In one embodiment, the apparatus 900 may include but not limited to at least one processor such as Central Processing Unit (CPU) 901, a computer-readable medium 902, and a memory 903. The memory 903 may comprise a volatile (e.g. Random Access Memory, RAM) and/or non-volatile memory (e.g. a hard disk or flash memory). In one embodiment, the computer-readable medium 902 may be configured to store a computer program and/or instructions, which, when executed by the processor 901, causes the processor 901 to carry out any of the above mentioned methods.

In one embodiment, the computer-readable medium 902 (such as non-transitory computer readable medium) may be stored in the memory 903. In another embodiment, the computer program can be stored in a remote location for example computer program product 904 (also can be embodied as computer-readable medium), and accessible by the processor 901 via for example carrier 905.

The computer-readable medium 902 and/or the computer program product 904 can be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

The following further aspects are proposed herein:

Aspect 1: A method for installing/creating PDRs which affects all the Sx sessions or a subset of the Sx sessions in the UPF.

Aspect 2. The method of aspect 1, comprising:
 a. Sx Node PDR Management Request and Response message. The request including:
  i. Create new Node PDR(s).
   1) the Node PDR parameters along with the list of session IDs that the PDR applies to,
   2) a PDR precedence,
   3) and an optional indication of a group of sessions that the PDR applies to (group ID).
  ii. Update Node PDR(s), to modify the corresponding Node PDR parameters.
  iii. Delete Node PDR(s), to delete a certain Node PDR(s).
 b. The response on above procedure indicating the creation success.

Aspect 3. Existing Sx Session Establishment procedure, including an indication if the session belongs to a group.

Aspect 4. Existing Sx Session Modification procedure, including any modification on the group the session belongs to.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP third Generation Partnership Project
CPF Control Plane Function
EPC Evolved Packet Core
FAR Forwarding Action Rule
PCRF Policy and Charging Rule Function
PDI Packet Detection Information
PDR Packet Detection Rule
PFCP Packet Forwarding Control Protocol
PGW Packet Data Network Gateway
PGW-C PDN Gateway Control Plane Function
PGW-U PDN Gateway User Plane Function
QER QoS Enforcement Rule
SGW Servicing Network Gateway
SGW-C Serving Gateway Control Plane Function
SGW-U Serving Gateway User Plane Function
TDF Traffic Detection Function
TDF-C Traffic Detection Function Control Plane Function
TDF-U Traffic Detection Function User Plane Function
UPF User Plane Function
URR Usage Reporting Rule

What is claimed is:

1. A method performed by a first network node configured as control plane function (CPF), the first network node is coupled, via an Sx interface, to a second network node configured as user plane function (UPF), the method comprising:
   transmitting a request message associated with a Packet Detection Rule (PDR) to the second network node via the Sx interface, wherein
   the PDR is applicable to more than one Sx session,
   the request message includes an information element (IE),
   the IE contains indication information indicating that the PDR is applicable to the more than one Sx session,
   the indication information includes a group session identifier identifying two or more Sx sessions to which the PDR is applicable or the indication information indicates that the PDR is applicable to all Sx sessions associated with the second network node; and
   receiving a response message, from the second network node, indicating whether the transmitted request message is accepted or not by the second network node for applying the PDR.

2. The method according to claim 1, wherein the PDR is a node PDR, and the request message is an Sx node PDR management request message.

3. The method according to claim 2, wherein the Sx node PDR management request message indicates at least one of:
   a node PDR is to be added;
   an information element (IE) of a node PDR is to be modified; and
   a node PDR is to be removed.

4. The method according to claim 2, wherein the node PDR includes a node PDR identifier IE identifying the node PDR.

5. The method according to claim 4, wherein the indication information includes the flag indicating that PDR is applicable to all Sx sessions associated with the second network node.

6. The method according to claim 4, wherein the first network node transmits the Sx node PDR management request message associated with the node PDR in any one or more of the following procedures:
   a node PDR management request procedure, to indicate to which Sx sessions the node PDR is applicable;
   a session establishment request procedure, to indicate if the Sx session to be established is included in said two or more Sx sessions identified by the group session identifier; and
   Sx session modification request procedure, to indicate a modification of the group session identifier of the node PDR applicable to the Sx session to be modified.

7. The method according to claim 2, wherein the node PDR includes:
   a precedence IE identifying a precedence of the node PDR.

8. A method performed by a second network node configured as user plane function (UPF), the second network node is coupled, via an Sx interface, to a first network node configured as control plane function (CPF), the method comprising:
   receiving a message associated with a first Packet Detection Rule (PDR) from the first network node via the Sx interface, wherein
   the first PDR is applicable to more than one Sx session,
   the message includes an information element (IE),
   the IE contains indication information indicating that the first PDR is applicable to more than one Sx session, and
   the indication information includes a group session identifier identifying two or more Sx sessions to which the first PDR is applicable or the indication information indicates that first PDR is applicable to all Sx sessions associated with the second network node, and
   said two or more Sx sessions include a first Sx session;
   receiving a packet;
   performing Sx session look-up to identify an Sx session to which the received packet corresponds, wherein the identified Sx session is the first Sx session;
   determining that a group of one or more PDRs is applicable to the first Sx session, wherein the group of one or more PDRs includes the first PDR; and
   applying the first PDR.

9. The method according to claim 8, wherein the first PDR is a node PDR, and the message is an Sx node PDR management request message.

10. The method according to claim 9, wherein the method further comprising:
according to the Sx node PDR management request message, performing at least one of:
adding a node PDR;
modifying an information element (IE) of a node PDR; and
removing a node PDR.

11. The method according to claim 9, wherein the node PDR includes a node PDR identifier identifying the node PDR.

12. The method according to claim 11, wherein the indication information includes the flag indicating that first PDR is applicable to all Sx sessions associated with the second network node.

13. The method according to claim 9, wherein the node PDR includes:
a precedence IE identifying a precedence of the node PDR.

14. The method according to claim 9, the method further comprising:
selecting from the group of one or more PDRs the first PDR matching to the received packet together with a session level PDR in decreasing order of precedence, wherein the session level PDR includes IE identifying an Sx session.

15. The method according to claim 14, wherein the precedence of each of the one or more PDRs is higher than the precedence of the session level PDR.

16. The method according to claim 9, the method further comprising:
transmitting to the first network node an Sx node PDR management response message indicating whether the Sx node PDR management request message is accepted or rejected.

17. A first network node configured as control plane function (CPF), the first network node is coupled, via an Sx interface, to a second network node configured as user plane function (UPF), the first network node comprising:
at least one processor; and
a non-transitory computer readable medium coupled to the at least one processor, the non-transitory computer readable medium storing instructions executable by the at least one processor, whereby the first network node is configured to:
transmit a message associated with a Packet Detection Rule (PDR) to the second network node via the Sx interface, wherein
the PDR is applicable to more than one Sx session,
the message includes an information element (IE),
the IE contains indication information indicating that the PDR is applicable to the more than one Sx session, and
the indication information includes a group session identifier identifying two or more Sx sessions to which the PDR is applicable or the indication information indicates that the PDR is applicable to all Sx sessions associated with the second network node, and
the first network node is further configured to receive a response message, from the second network node, indicating whether the transmitted message is accepted or not by the second network node for applying the PDR.

18. A second network node configured as user plane function (UPF), the second network node is coupled, via an Sx interface, to a first network node configured as control plane function (CPF), the second network node comprising:
at least one processor; and
a non-transitory computer readable medium coupled to the at least one processor, the non-transitory computer readable medium storing instructions executable by the at least one processor, whereby the second network node is configured to:
receive a message associated with a first Packet Detection Rule (PDR) from the first network node via the Sx interface, wherein
the first PDR is applicable to more than one Sx session,
the message includes an information element (IE),
the IE contains indication information indicating that the first PDR is applicable to more than one Sx session, and
the indication information includes a group session identifier identifying two or more Sx sessions to which the first PDR is applicable or the indication information indicates that first PDR is applicable to all Sx sessions associated with the second network node, and
said two or more Sx sessions include a first Sx session;
receive a packet;
perform Sx session look-up to identify an Sx session to which the received packet corresponds, wherein the identified Sx session is the first Sx session;
determine that a group of one or more PDRs is applicable to the first Sx session, wherein the group of one or more PDRs includes the first PDR; and
apply the first PDR.

* * * * *